US012591153B2

(12) United States Patent
Chen et al.

(10) Patent No.: US 12,591,153 B2
(45) Date of Patent: Mar. 31, 2026

(54) VIEWING ANGLE CONTROL ELEMENT AND DISPLAY MODULE

(71) Applicants: Innolux Corporation, Miaoli County (TW); CARUX TECHNOLOGY PTE. LTD., Singapore (SG)

(72) Inventors: Chih-Chang Chen, Miaoli County (TW); Bo-Tsuen Chen, Miaoli County (TW); Li-Wei Sung, Tainan (TW)

(73) Assignees: Innolux Corporation, Miaoli County (TW); CARUX TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 18/893,946

(22) Filed: Sep. 23, 2024

(65) Prior Publication Data

US 2025/0138353 A1 May 1, 2025

(30) Foreign Application Priority Data

Oct. 25, 2023 (CN) .......................... 202311393110.4

(51) Int. Cl.
| | |
|---|---|
| *G02F 1/13* | (2006.01) |
| *G02F 1/1333* | (2006.01) |
| *G02F 1/1339* | (2006.01) |
| *H01J 19/50* | (2006.01) |
| *H01J 19/52* | (2006.01) |

(52) U.S. Cl.
CPC ...... *G02F 1/1323* (2013.01); *G02F 1/133331* (2021.01); *G02F 1/13398* (2021.01)

(58) Field of Classification Search
CPC .... G02F 1/1323; G02F 1/16698; H01J 19/50; H01J 19/52; H01J 29/028
See application file for complete search history.

(56) References Cited

U.S. PATENT DOCUMENTS

| | | | | |
|---|---|---|---|---|
| 10,622,514 | B1 * | 4/2020 | Atanackovic ...... | H10H 20/0137 |
| 2011/0317109 | A1 * | 12/2011 | So ..................... | G02F 1/133512 |
| | | | | 349/155 |
| 2021/0151702 | A1 * | 5/2021 | Fan ...................... | H10K 59/878 |
| 2021/0389510 | A1 * | 12/2021 | Xu ........................... | G02B 1/11 |
| 2022/0011608 | A1 | 1/2022 | Hsieh et al. | |

FOREIGN PATENT DOCUMENTS

| | | |
|---|---|---|
| CN | 114326221 | 4/2022 |
| CN | 116249409 | 6/2023 |
| TW | 1504974 | 10/2015 |

* cited by examiner

*Primary Examiner* — Joseph L Williams
(74) *Attorney, Agent, or Firm* — JCIPRNET

(57) ABSTRACT

A viewing angle control element and a display module are provided. The viewing angle control element includes a first substrate, a plurality of first spacer units, a plurality of second spacer units, and a second substrate. The plurality of first spacer units are disposed on the first substrate. The plurality of second spacer units are respectively disposed on the plurality of first spacer units. The second substrate is disposed on the plurality of second spacer units. A reflectivity of the plurality of first spacer units is greater than a reflectivity of the plurality of second spacer units.

19 Claims, 8 Drawing Sheets

VIEWING ANGLE CONTROL ELEMENT AND DISPLAY MODULE

CROSS-REFERENCE TO RELATED APPLICATION

This application claims the priority benefit of China application serial no. 202311393110.4, filed on Oct. 25, 2023. The entirety of the above-mentioned patent application is hereby incorporated by reference herein and made a part of this specification.

BACKGROUND

Technical Field

The disclosure relates to an electric device, and in particular relates to a viewing angle control element and a display module.

Description of Related Art

Electronic devices including display modules, such as laptops or vehicle monitors, have become indispensable necessities in modern society. With the booming development of electronic products, consumers hold high expectations for the quality, functionality, or price of these products. Recently, controlling the viewing angle of display modules has become increasingly important due to safety and/or privacy considerations. However, the anti-peeping screens currently on the market have the issue of reducing the light output efficiency of the display module. Therefore, developing a new anti-peeping element to further improve the light output efficiency of the display module is still one of the current research topics in the industry.

SUMMARY

A viewing angle control element and a display module, which facilitate the improvement of light output efficiency, are provided in the disclosure.

In an embodiment of the disclosure, the viewing angle control element includes a first substrate, multiple first spacer units, multiple second spacer units, and a second substrate. The first spacer units are disposed on the first substrate. The second spacer units are respectively disposed on the first spacer units. The second substrate is disposed on the second spacer units. A reflectivity of the first spacer units is greater than a reflectivity of the second spacer units.

In another embodiment of the disclosure, a display module includes a backlight, a display panel, and a viewing angle control element. The display panel is disposed on the backlight. The viewing angle control element is disposed between the backlight and the display panel and includes a first substrate, multiple first spacer units, multiple second spacer units, and a second substrate. The first spacer units are disposed on the first substrate. The second spacer units are respectively disposed on the first spacer units. The second substrate is disposed on the second spacer units. A reflectivity of the first spacer units is greater than a reflectivity of the second spacer units.

In order to make the above-mentioned features and advantages of the disclosure comprehensible, embodiments accompanied with drawings are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
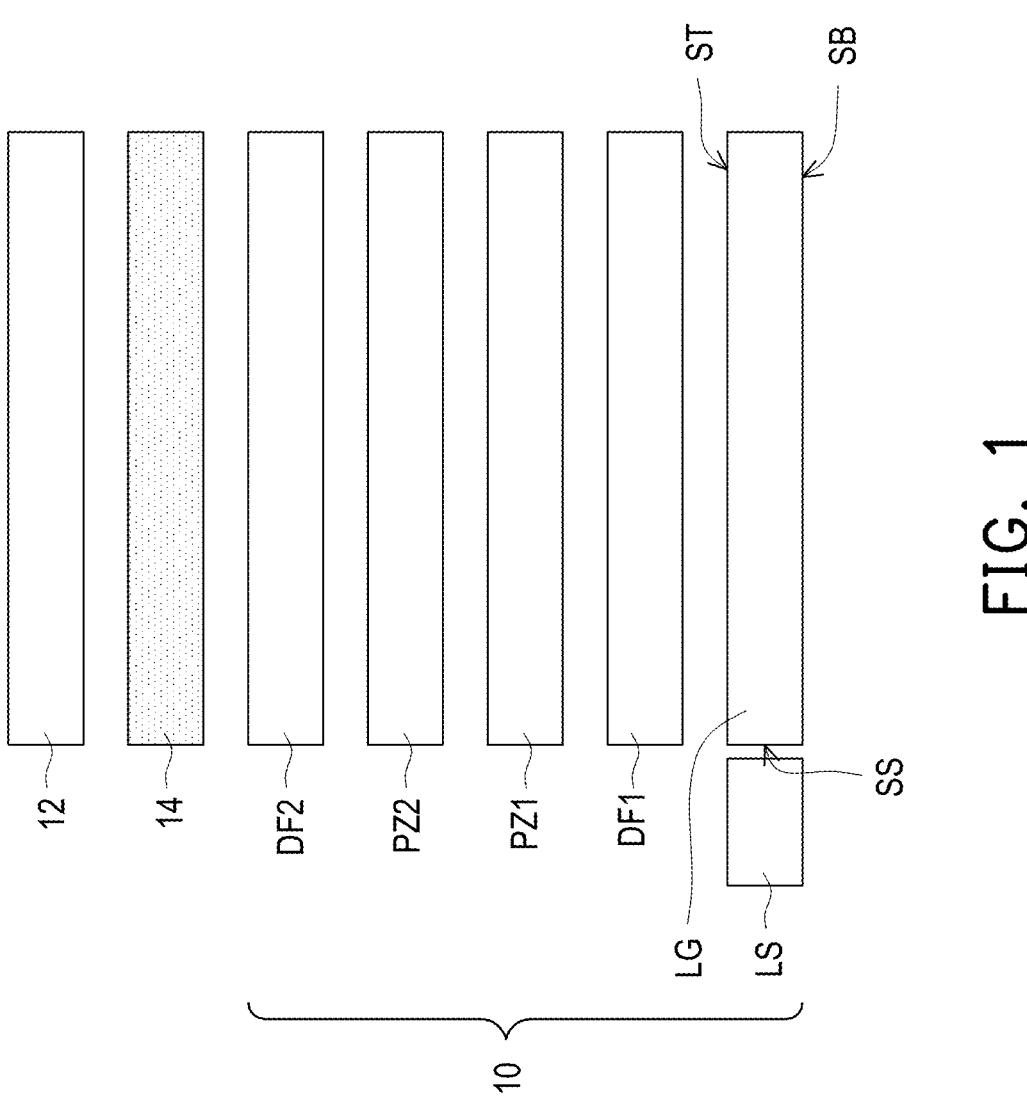
FIG. 1 is a cross-sectional schematic diagram of a display module according to some embodiments of the disclosure.

References of the exemplary embodiments of the disclosure are to be made in detail. Examples of the exemplary embodiments are illustrated in the drawings. If applicable, the same reference numerals in the drawings and the descriptions indicate the same or similar parts.

Certain terms may be used throughout the disclosure and the appended patent claims to refer to specific elements. It should be understood by those of ordinary skill in the art that electronic device manufacturers may refer to the same element by different names. The disclosure does not intend to distinguish between elements that have the same function but have different names. In the following description and patent claims, words such as "comprising" and "including" are open-ended words, so they should be interpreted as meaning "including but not limited to . . . ".

In the disclosure, wordings used to indicate directions, such as "up," "down," "front," "back," "left," and "right," merely refer to directions in the accompanying drawings. Therefore, the directional wordings are used to illustrate rather than limit the disclosure. In the accompanying drawings, the drawings illustrate the general features of the methods, structures, and/or materials used in the particular embodiments. However, the drawings shall not be interpreted as defining or limiting the scope or nature covered by the embodiments. For example, the relative sizes, thicknesses, and locations of the layers, regions, and/or structures may be reduced or enlarged for clarity.

A structure (or layer, element, substrate) described in this disclosure is located on/above another structure (or layer, element, substrate), may indicate that the two structures are adjacent and directly connected, or may indicate that the two structures are adjacent but not directly connected. Indirect connection means that there is at least one intermediate structure (or intermediate layer, intermediate element, intermediate substrate, intermediate spacer) between the two structures, the lower surface of one structure is adjacent to or directly connected to the upper surface of the intermediate structure, and the upper surface of another structure is adjacent to or directly connected to the lower surface of the intermediate structure. The intermediate structure may be composed of a single-layer or multi-layer physical structure or a non-physical structure, which is not limited thereto. In the disclosure, when a certain structure is disposed "on" other structures, it may mean that a certain structure is "directly" on other structures, or it means that a certain structure is "indirectly" on other structures, that is, at least one structure is sandwiched between a certain structure and other structures.

The terms "about", "substantially" or "generally" are interpreted as within 10% of a given value or range, or interpreted as within 5%, 3%, 2%, 1%, or 0.5% of the given value or range. Furthermore, the terms "range from a first value to a second value", "range between a first value to a second value" mean that the range includes the first value, the second value, and other values in between.

The terms such as "first", "second", etc. used in the description and the patent claims are used to modify elements, which do not imply and represent that the (or these) elements have any previous ordinal numbers, and also does not represent the order of a certain element and another element, or the order of the manufacturing method. The use of these ordinal numbers is to only clearly distinguish an element with a certain name from another element with the same name. The same terms may not be used in the patent claims and the description, and accordingly, the first component in the description may be the second component in the patent claims.

The electrical connection or coupling described in the disclosure may refer to direct connection or indirect connection. In the case of a direct connection, the end points of two elements on a circuit directly connect to each other, or connect to each other through a conductive wire. In the case of indirect connection, a switch, a diode, a capacitor, an inductor, a resistor, other suitable elements, or a combination thereof, but not limited therein, is between the end points of two elements on a circuit.

In the disclosure, the thickness, length, and width may be measured by adopting a measurement method such as an optical microscope (OM), and the thickness or width may be measured from a cross-sectional image in an electronic microscope, but not limited thereto. In addition, any two values or directions used for comparison may have certain errors. Additionally, references to the terms "substantially," or "generally" throughout this disclosure generally mean within 10% of a given value or range. Furthermore, the terms "a given range is from a first value to a second value", "a given range is within a range from the first value to the second value", or "a given range is between the first value to the second value" means that the given range includes the first value, the second value, and other values in between. If a first direction is perpendicular to a second direction, an angle between the first direction and the second direction may be between 80 degrees and 100 degrees; if the first direction is parallel to the second direction, an angle between the first direction and the second direction may be between 0 degrees and 10 degrees.

Unless otherwise defined, all terms (including technical and scientific terms) used herein have the same meaning as commonly understood by one of ordinary skill in the art to which this disclosure belongs. It is understood that these terms, such as those defined in commonly used dictionaries, should be interpreted as having meanings consistent with the relevant art and the background or context of the disclosure, and should not be interpreted in an idealized or overly formal manner, unless otherwise defined in the embodiments of the disclosure.

In the disclosure, an electronic device may include a display device, a backlight device, a sensing device, or a splicing device, but not limited thereto. The electronic device may be a bendable or flexible electronic device. The display device may be a non-self-luminous display device or a self-luminous display device. The display device may include, for example, liquid crystal, light emitting diode, fluorescence, phosphor, quantum dot (QD), other suitable display media, or a combination thereof. The sensing device may be a sensing device for sensing capacitance, light, heat or ultrasonic waves, but not limited thereto. In the disclosure, an electronic device may include electronic elements, and the electronic elements may include passive elements and active elements, such as a capacitor, a resistor, an inductor, a diode, a transistor, and the like. Diodes may include light-emitting diodes, varactor diodes, or photodiodes. The light emitting diode may include, for example, an organic light emitting diode (OLED), a mini light emitting diode (mini LED), a micro light emitting diode (micro LED), or a quantum dot light emitting diode (quantum dot LED), but not limited thereto. The splicing device may be, for example, a display splicing device or an antenna splicing device, but not limited thereto. It should be noted that, the electronic device may be any arrangement and combination of the foregoing, but not limited thereto. In addition, the shape of the electronic device may be rectangular, circular, polygonal, a shape with curved edges, or other suitable shapes. The electronic device may have a peripheral system such as a driving system, a control system, a light source system, and the like to support a display device, a wearable device (e.g., including augmented reality or virtual reality), an in-vehicle device (e.g., including car windshields), or a splicing device.

It should be noted that, in the following embodiments, the features in several different embodiments may be replaced, reorganized, and mixed to complete other embodiments without departing from the spirit of the disclosure. As long as the features of the various embodiments do not violate the spirit of the disclosure or conflict with one another, they may be mixed and matched arbitrarily.

Figure 7:
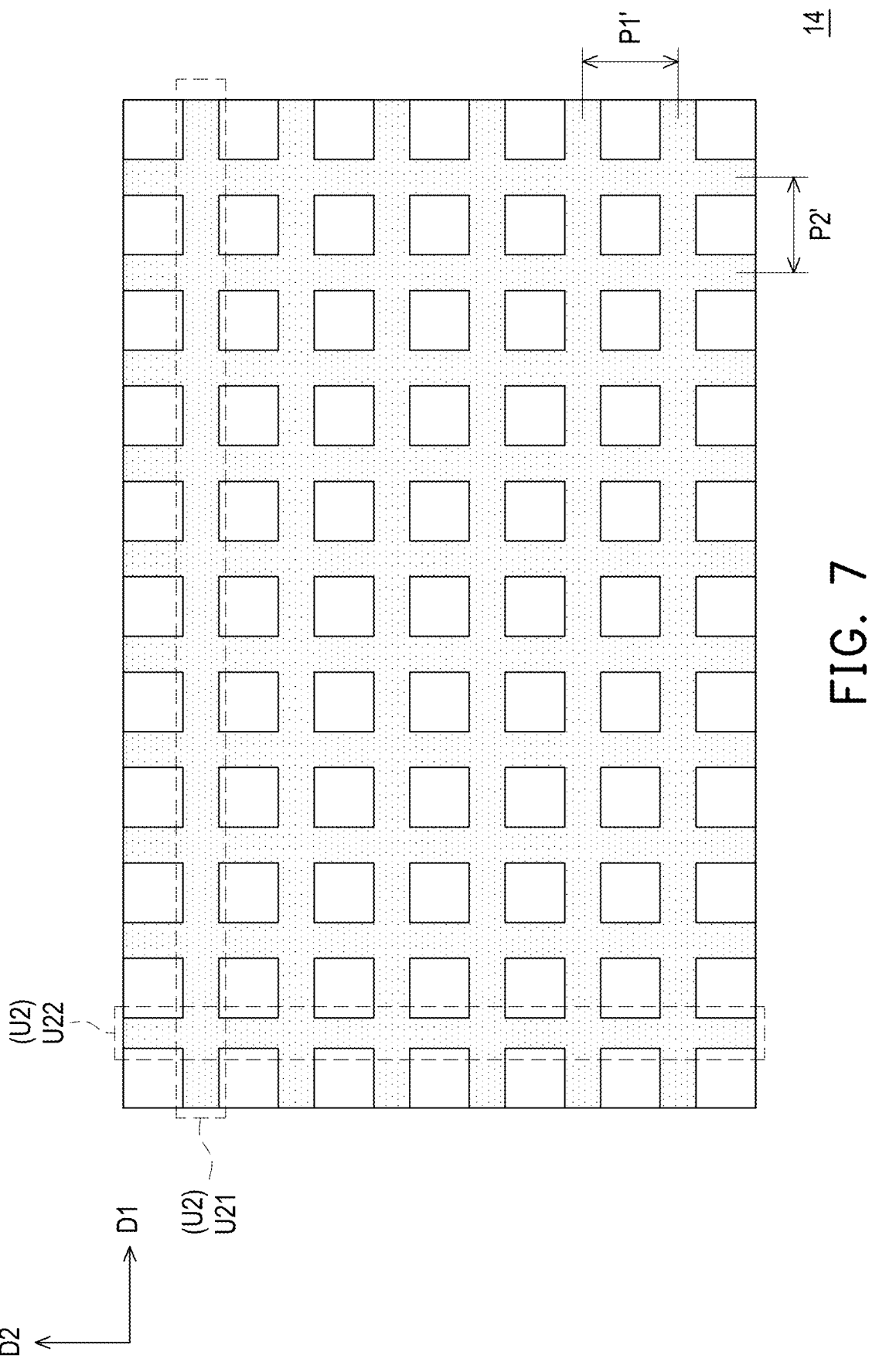
FIG. 7 and FIG. 8 are partial top schematic diagrams of various viewing angle control elements according to some embodiments of the disclosure.
Figure 8:
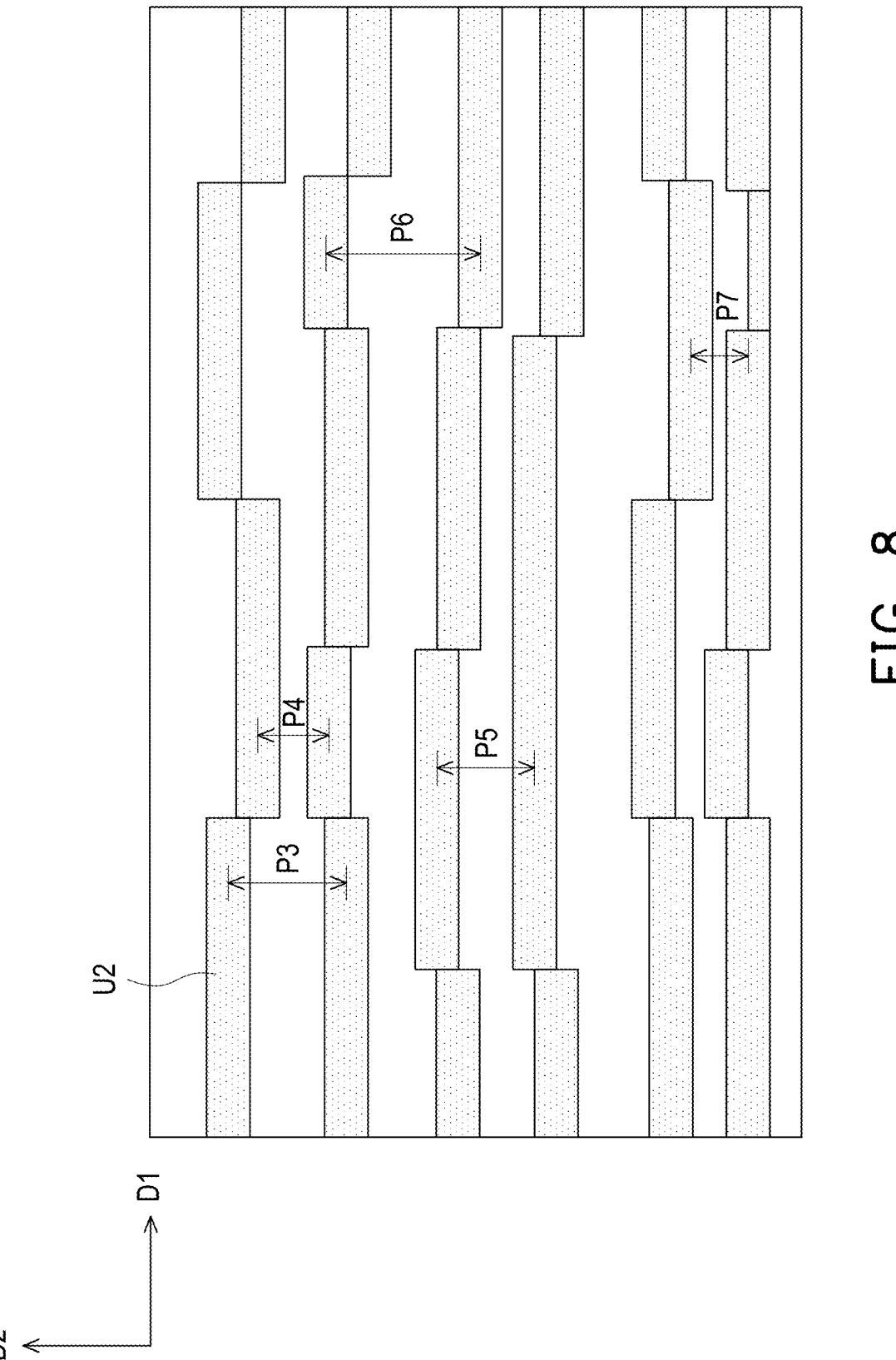

FIG. 1 is a cross-sectional schematic diagram of a display module according to some embodiments of the disclosure. FIG. 2 to FIG. 6 are partial cross-sectional schematic diagrams of various viewing angle control elements according to some embodiments of the disclosure. FIG. 7 and FIG. 8 are partial top schematic diagrams of various viewing angle control elements according to some embodiments of the disclosure, in which FIG. 7 and FIG. 8 only schematically illustrate the second spacer unit and omit other elements.

Figure 2:
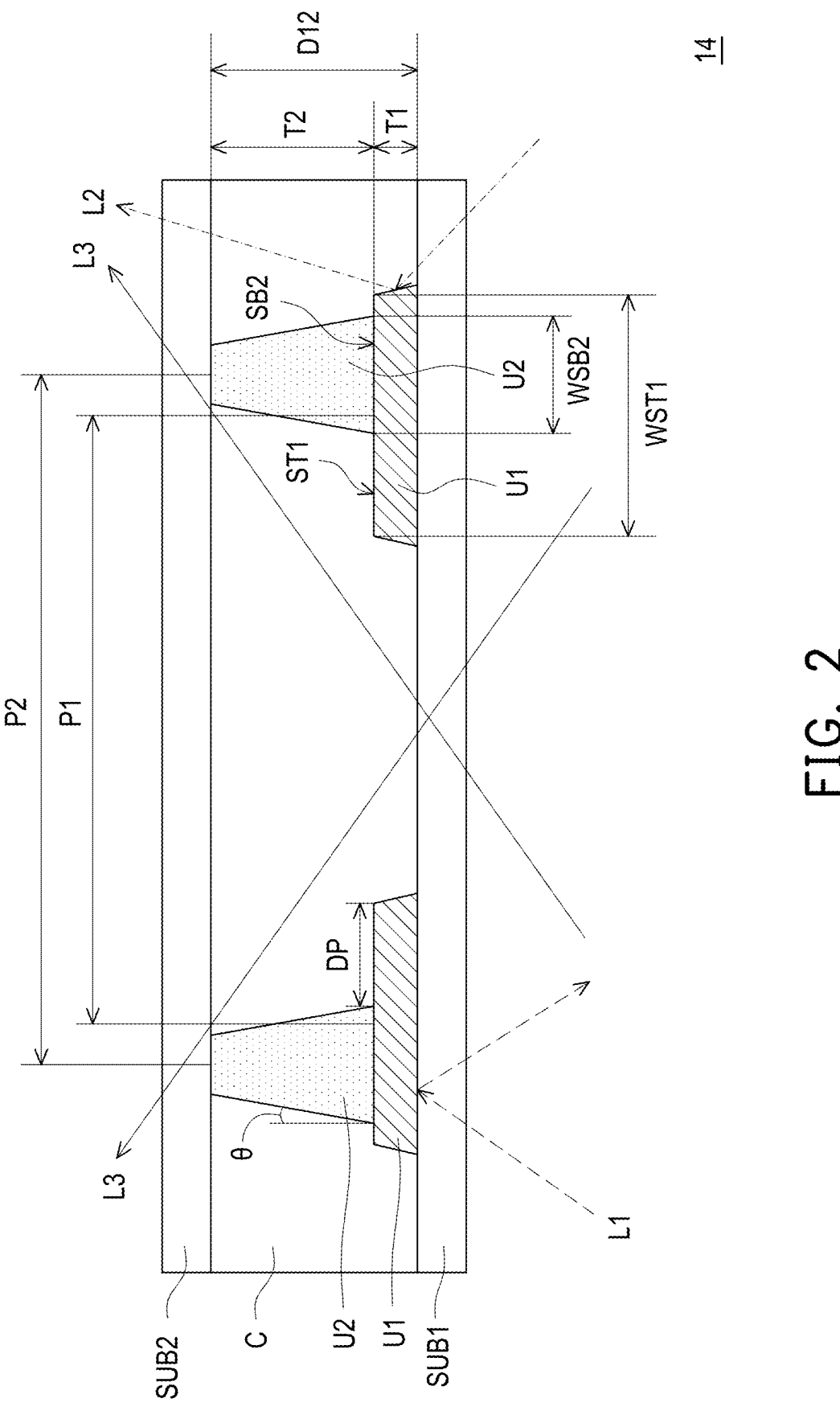
FIG. 2 to FIG. 6 are partial cross-sectional schematic diagrams of various viewing angle control elements according to some embodiments of the disclosure.

Referring to FIG. 1 and FIG. 2 first, a display module 1 may include a backlight 10, a display panel 12, and a viewing angle control element 14. The display panel 12 is disposed on the backlight 10. The viewing angle control element 14 is disposed between the backlight 10 and the display panel 12 and includes a first substrate SUB1, multiple first spacer units U1, multiple second spacer units U2, and a second substrate SUB2. The first spacer units U1 are disposed on the first substrate SUB1. The second spacer units U2 are respectively disposed on the first spacer units U1. The second substrate SUB2 is disposed on the second spacer units U2. A reflectivity of the first spacer units U1 is greater than a reflectivity of the second spacer units U2.

In detail, as shown in FIG. 1, the backlight 10 may be configured to provide an illumination light. The type of backlight 10 is not limited. For example, the backlight 10 may be a direct backlight or an edge-lit backlight. Taking the edge-lit backlight as an example, as shown in FIG. 1, the backlight 10 may include a light guide plate LG, a light source LS, and multiple optical films (e.g., a diffuser DF1, a prism film PZ1, a prism film PZ2, and a diffuser DF2).

The light guide plate LG may be configured to transmit light from the light source LS. The material of the light guide plate LG includes, for example, glass or plastic, but not limited thereto. Plastics may include polycarbonate (PC), polyimide (PI), polypropylene (PP), polyethylene terephthalate (PET), and other suitable flexible materials or a combination of the aforementioned materials, but not limited thereto.

In some embodiments, although not shown, at least one of the upper surface ST and the lower surface SB of the light guide plate LG may be formed with multiple microstructures. The distribution density of the microstructures may gradually increase in a direction away from the light source LS to improve brightness uniformity, but not limited to this.

The light source LS is disposed adjacent to the side SS of the light guide plate LG, and the light emitted by the light source LS may enter the light guide plate LG through the side SS of the light guide plate LG. Although not shown, the light source LS may include a circuit board and multiple light-emitting elements. The light-emitting elements are disposed on the circuit board and may be electrically connected to an external circuit through the circuit board. The circuit board includes, for example, a printed circuit board or a flexible printed circuit board, but not limited thereto. The light-emitting elements may include multiple light-emitting diodes (LEDs), multiple organic light-emitting diodes (OLEDs), multiple mini light-emitting diodes (mini LEDs), multiple micro light-emitting diodes (micro LEDs), or multiple quantum dot light-emitting diodes (quantum dot LEDs).

The diffuser DF1, the prism film PZ1, the prism film PZ2, and the diffuser DF2 are sequentially stacked on the upper surface ST of the light guide plate LG to adjust the light pattern and energy distribution of the illumination light output from the backlight 10.

In some embodiments, although not shown, the backlight 10 may also include a reflective film. The reflective film may be disposed adjacent to the lower surface SB of the light guide plate LG to reflect the light transmitted toward the lower surface SB, so that the light has a chance to be emitted from the upper surface ST of the light guide plate LG. It should be understood that the type and/or number of elements or film layers in the backlight 10 may be changed according to requirements and is not limited to what is shown in FIG. 1.

The display panel 12 is, for example, disposed on the diffuser DF2, and the display panel 12 may be configured to convert the illumination light from the backlight 10 into image light with display information (e.g., grayscale, color). The display panel 12 may be a non-self-luminous display panel, such as a liquid crystal display panel, but not limited thereto. The liquid crystal display panel may include multiple pixels arranged in an array, and the grayscale and color of each pixel may be independently controlled to provide a display image.

The viewing angle control element 14 is, for example, disposed between the diffuser DF2 and the display panel 12, and the viewing angle control element 14 may be configured to control the angle of light output from each region of the viewing angle control element 14, so that the display module 1 may provide a normal mode, an anti-peeping mode, or a combination of the above.

As shown in FIG. 2, in the viewing angle control element 14, the first substrate SUB1 may be a hard substrate or a flexible substrate. The material of the first substrate SUB1 includes, for example, light-transmitting materials, such as glass, quartz, ceramics, sapphire, or plastic, but not limited thereto. Plastics may include polycarbonate (PC), polyimide (PI), polypropylene (PP), polyethylene terephthalate (PET), and other suitable flexible materials or a combination of the aforementioned materials, but not limited thereto.

The first spacer units U1 are, for example, located between the second spacer units U2 and the first substrate SUB1. The material of the first spacer units U1 includes, for example, a metal with a high reflectivity, such as a metal with a reflectivity greater than 80%, but not limited thereto. Metals with a reflectivity greater than 80%, for example, refer to metals with a reflectivity greater than 80% for visible light (e.g., light with a wavelength in the range of 400 nm to 700 nm), such as gold, silver, aluminum, copper, platinum, chromium, nickel or a combination of the above, but not limited thereto.

The second spacer units U2 are, for example, located between the first spacer units U1 and the second substrate SUB2. The material of the second spacer units U2 includes, for example, light-absorbing materials or semi-transmitting and semi-reflecting materials, such as dark ink, colored photoresist or black matrix, but not limited thereto.

The second spacer units U2 and the first spacer units U1 are disposed, for example, in a one-to-one relationship. In some embodiments, the width WST1 of the upper surface ST1 of at least one of the first spacer units U1 may be greater than the width WSB2 of the lower surface SB2 of at least one of the second spacer units U2 to facilitate manufacturing.

The second substrate SUB2 covers the second spacer units U2. For the material of the second substrate SUB2, reference may be made to the material of the first substrate SUB1, thus details are not repeated herein.

According to different requirements, the viewing angle control element 14 may include other elements or film layers. Taking FIG. 2 as an example, the viewing angle control element 14 may also include a transparent protective layer C. The transparent protective layer C is disposed between the first substrate SUB1 and the second substrate SUB2, and the transparent protective layer C, for example, laterally surrounds the second spacer units U2 and covers the first spacer units U1. The transparent protective layer C may provide filling, planarization, and/or protection functions. The material of the transparent protective layer C may be a photo-curing material or a thermo-curing material, such as polyimide resin or acrylic resin, but not limited thereto. In some embodiments, the distance D12 between the first substrate SUB1 and the second substrate SUB2 may be maintained through the transparent protective layer C, but not limited thereto. In other embodiments, the distance D12 between the first substrate SUB1 and the second substrate SUB2 may be maintained by the first spacer units U1 and the second spacer units U2.

The light (e.g., light L1) directed to the bottom surface of the first spacer unit U1 may be reflected by disposing the first spacer units U1 with greater reflectivity between the second spacer units U2 and the first substrate SUB1, thereby increasing the recycling rate of light and facilitating the improvement of light output efficiency or luminance. In addition, the light (e.g., light L2) directed to the side of the first spacer unit U1 may be reflected by the first spacer unit U1 and emitted from the viewing angle control element 14, which facilitates the improvement of light output efficiency or luminance. In addition, the light output angle of the light (e.g., light L3) emitted from two adjacent second spacer units U2 may be controlled by controlling various parameters (e.g., thickness, pitch, tilt angle, etc.) of the first spacer units U1 and the second spacer units U2. In some embodiments, the thickness T1 of the first spacer units U1 is, for example, 1 μm to 20 μm (i.e., 1 μm≤T1≤20 μm), and the pitch P1 of the first spacer units U1 is, for example, 1 μm to 20 μm (i.e., 1 μm≤P1≤20 μm). In some embodiments, the thickness T2 of the second spacer units U2 is, for example, 1 μm to 20 μm (i.e., 1 μm≤T2≤20 μm), and the pitch P2 of the second spacer units U2 is, for example, 5 μm to 100 μm (i.e., 5 μm≤P2≤100 μm). In some embodiments, the relative displacement DP of the first spacer unit U1 and the corresponding second spacer unit U2 (e.g., the distance between the edge of the upper surface ST1 of the first spacer unit U1 and the corresponding edge of the lower surface SB2 of the second spacer unit U2) is, for example, 1 μm to 20 μm (i.e., 1 μm≤DP≤20 μm). In some embodiments, the tilt angle θ of the side surface of the second spacer unit U2 is, for example, 0 degrees to 60 degrees (i.e., 0° ≤θ≤60°). In some embodiments, the distance D12 between the first substrate SUB1 and the second substrate SUB2 is, for example, 10 μm to 100 μm (i.e., 10 μm≤D12≤100 μm). In some embodiments, the second spacer units U2 may all contact the second substrate; in other embodiments, the second spacer units U2 may all not contact the second substrate, but not limited thereto.

Since the viewing angle control element 14 may be manufactured by adopting the current TFT process without the need for supply from external manufacturers, it may save both production costs and time, and micron level precision may be achieved. In addition, the modulation of the relevant parameters of the first spacer units U1 and the second spacer units U2 also facilitates the improvement of moiré pattern caused by pattern interference between the anti-peeping screen and multiple pixels of the display panel.

Figure 3:
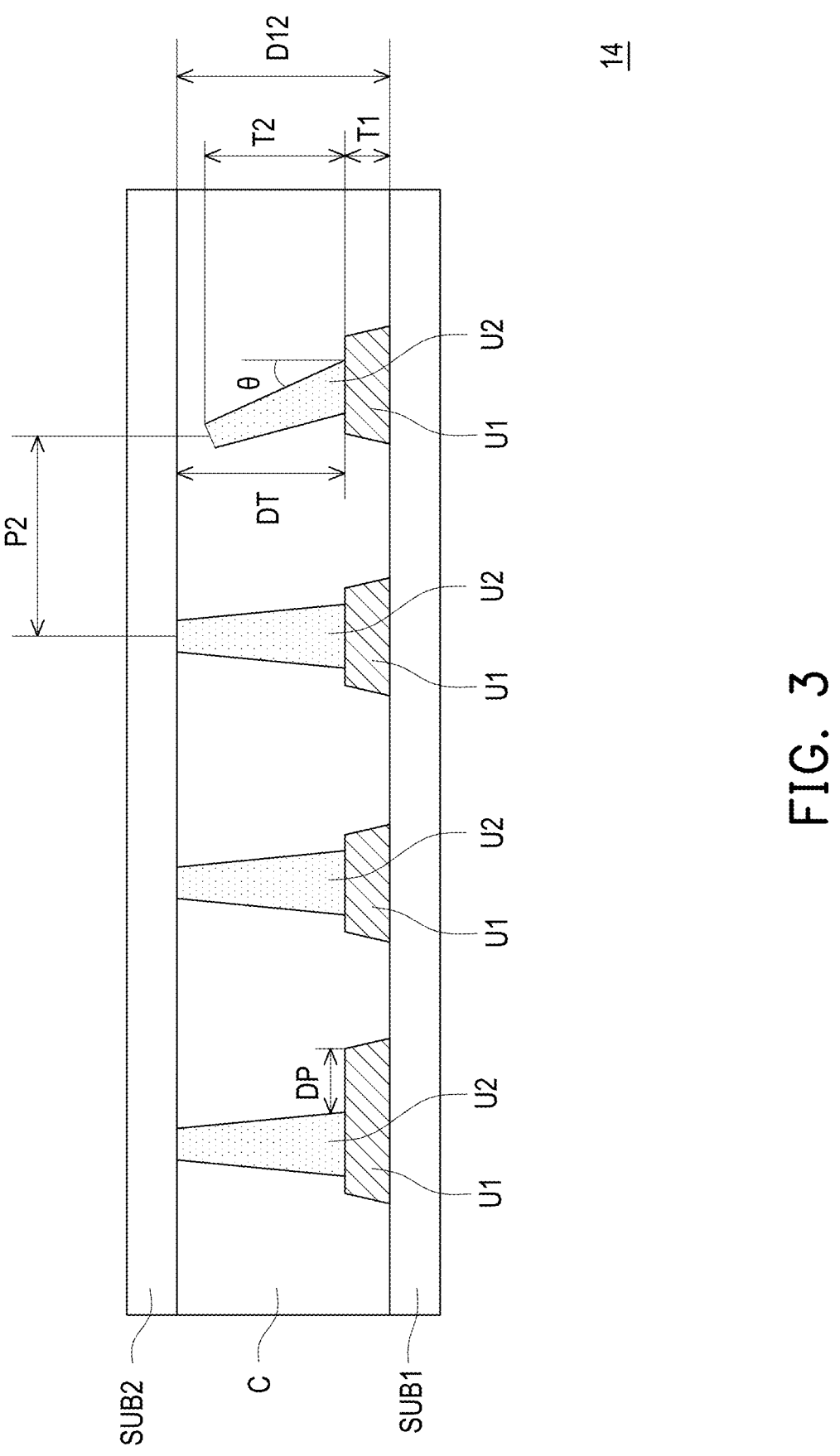

In some embodiments, relevant parameters of the second spacer units U2 (e.g., thickness T2, pitch P2, tilt angle θ, and/or relative displacement DP, etc.) may be changed according to requirements (e.g., light output viewing angle). As shown in FIG. 3, the thickness T2 of at least one of the second spacer units U2 (the rightmost second spacer unit U2 in FIG. 3) may be less than the distance DT between the first spacer unit U1 and the second substrate SUB2. That is, at least one of the second spacer units U2 may not be in contact with the second substrate SUB2, and the transparent protective layer, in addition to being disposed between the first substrate SUB1 and the second substrate SUB2, may also be located between at least one of the second spacer units U2 and the second substrate SUB2.

Figure 4:
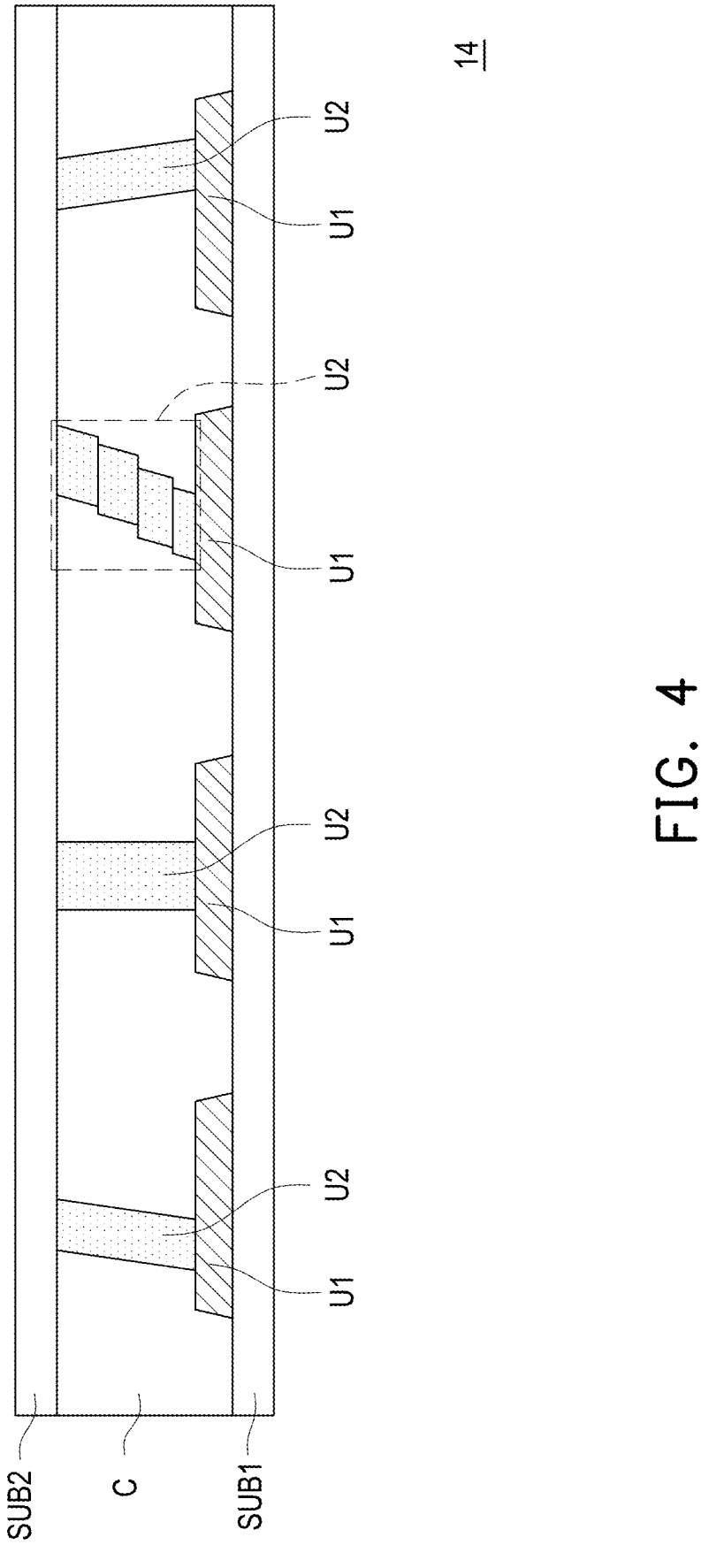

In some embodiments, the cross-sectional shape of the second spacer units U2 may also be changed according to requirements (such as light output viewing angle). As shown in FIG. 4, the cross-sectional shape of the second spacer units U2 may be quadrilateral, stepped, or a combination of the above. The quadrilateral may include a rectangle, a parallelogram, a trapezoid (referring to FIG. 3) or a combination of the above, but not limited thereto.

Figure 5:
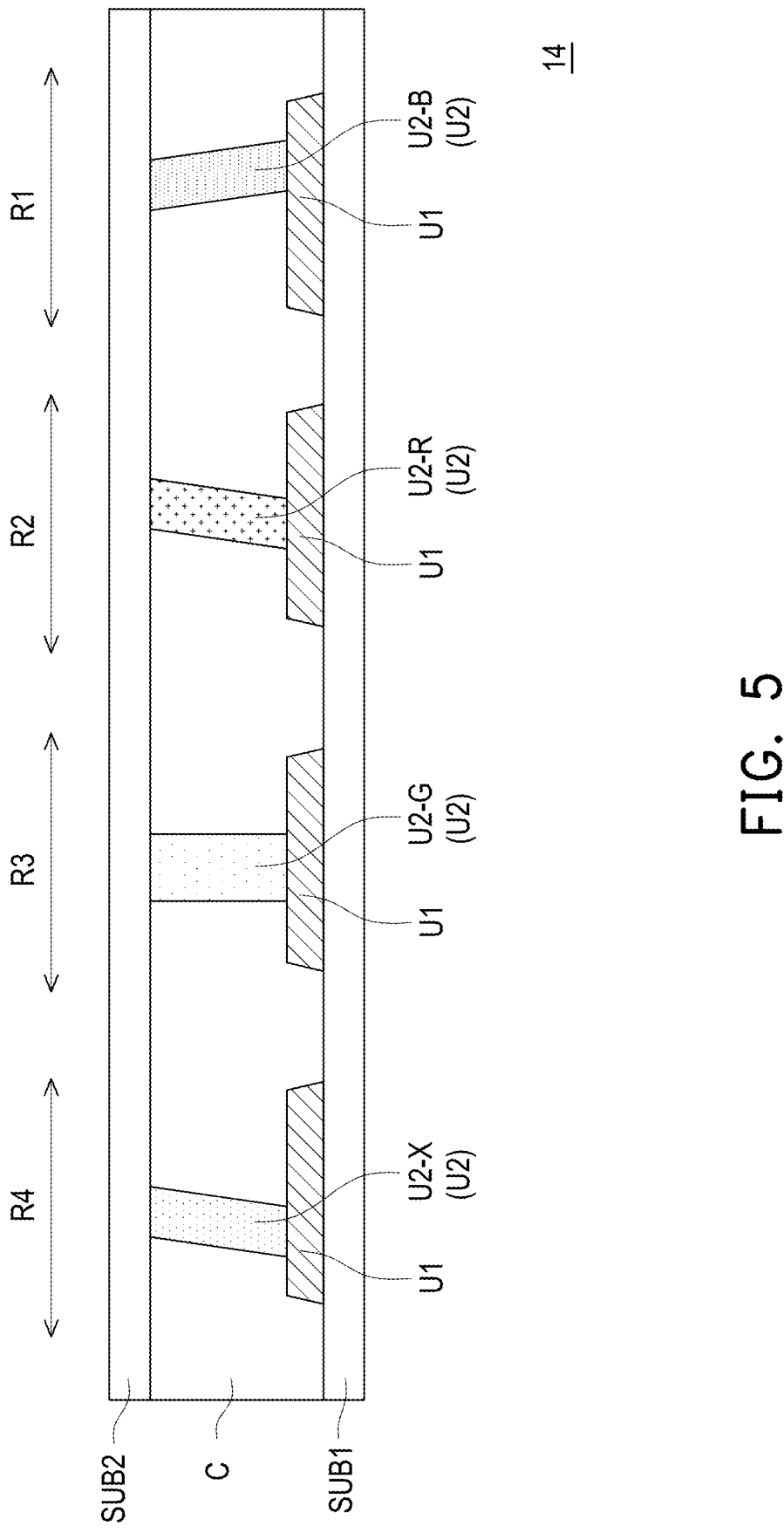

In some embodiments, the colors of the second spacer units U2 may also be changed according to requirements. As shown in FIG. 5, the second spacer units U2 may include a first sub-unit U2-B and a second sub-unit U2-R, and the first sub-unit U2-B and the second sub-unit U2-R have different colors. In addition, the first sub-unit U2-B is, for example, disposed in the first region R1 of the display module 1 (referring to FIG. 1), and the second sub-unit U2-R is, for example, disposed in the second region R2 of the display module 1. The issue of color deviation in wide viewing angles may be corrected by disposing sub-units of different colors in different regions of the display module 1. For example, if the color of a certain region of the display module is bluish, a complementary color sub-unit (e.g., a yellow sub-unit) may be disposed in the region to correct the color deviation.

In some embodiments, as shown in FIG. 5, the second spacer units U2 may also include a third sub-unit U2-G disposed in the third region R3 of the display module 1 (referring to FIG. 1) and a fourth sub-unit U2-X disposed in the fourth region R4 of the display module 1 (referring to FIG. 1). The first sub-unit U2-B, the second sub-unit U2-R, the third sub-unit U2-G and the fourth sub-unit U2-X have different colors. For example, the colors of the first sub-unit U2-B, the second sub-unit U2-R, the third sub-unit U2-G, and the fourth sub-unit U2-X are respectively blue, red, green, and black, but the disclosure is not limited thereto. The color types of the second spacer units U2 may be changed according to requirements.

Figure 6:
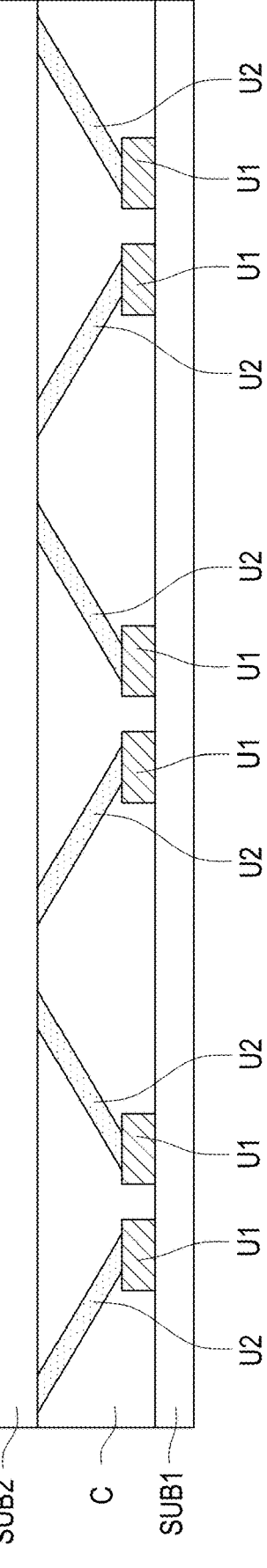

In some embodiments, as shown in FIG. 6, two adjacent second spacer units U2 may have opposite tilt directions to provide a symmetrical light pattern, but not limited thereto. It should be understood that the elements in FIG. 6 are only for illustration, and the relevant parameters of each element (e.g., thickness, pitch, tilt angle, and/or relative displacement of the first spacer unit U1 and the second spacer unit U2, etc.) may be changed according to requirements.

In some embodiments, as shown in FIG. 7, the second spacer units U2 may include multiple sub-units U21 extending in the direction D1 and multiple sub-units U22 extending in the direction D2, to respectively limit the viewing angles in direction D2 and direction D1. In some embodiments, the sub-units U21 may have the same pitch P1' in the direction D2, and the sub-units U22 may have the same pitch P2' in the direction D1, but the disclosure is not limited thereto. In other embodiments, although not shown, the second spacer units U2 may include multiple sub-units U21 extending in the direction D1 and not include multiple sub-units U22 extending in the direction D2. Alternatively, the second spacer units U2 may include multiple sub-units U22 extending in the direction D2 and not include multiple sub-units U21 extending in the direction D1. Furthermore, multiple sub-units (e.g., multiple sub-units U21 or multiple sub-units U22) may have a single pitch or multiple pitches.

In some embodiments, as shown in FIG. 8, the second spacer units U2 may have various pitches (e.g., pitch P3, pitch P4, pitch P5, pitch P6, pitch P7, etc.) or various densities to respectively provide normal mode and anti-peeping mode in different regions of the display module (e.g., the display module 1 in FIG. 1). In detail, the second spacer units U2 may be designed according to the opening region of the display panel (e.g., the display panel 12 in FIG. 1) to increase the light output efficiency, and may provide an anti-peeping mode through a regional small-pitch design, and provide a normal mode through a regional large-pitch design. For example, when the display module is applied to a vehicular display device, the regions corresponding to the driver seat and the passenger seat may be designed in an anti-peeping mode (or narrow viewing angle mode) to reduce image interference. Additionally, the region of the display module corresponding to the central control panel may be designed in a normal mode, allowing both the driver and the passenger to view the images displayed on the central control panel.

Although FIG. 8 schematically illustrates that the second spacer units U2 respectively extend in the direction D1 to limit the viewing angle in the direction D2 through pitch or density design, the disclosure is not limited thereto. In other embodiments, the second spacer units U2 may respectively extend in the direction D2 to limit the viewing angle in the direction D1 through pitch or density design. Alternatively, the second spacer units U2 may respectively extend in the direction D1 and the direction D2 to limit the viewing angles in the direction D2 and the direction D1 through pitch or density design.

To sum up, in the embodiments of the disclosure, the light directed to the first spacer unit may be reflected by disposing the first spacer units with greater reflectivity between the second spacer units and the first substrate, thereby increasing the recycling rate of light and facilitating the improvement of light output efficiency or luminance.

The foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments may still be modified, or parts or all of the technical features thereof may be equivalently replaced; however, these modifications or substitutions do not deviate the essence of the corresponding technical solutions from the scope of the technical solutions of the embodiments of the disclosure.

Although the embodiments of the disclosure and the advantages thereof have been disclosed above, it should be understood that any person with ordinary skill in the art may make changes, substitutions, and modifications without departing from the spirit and scope of the disclosure, and the features of the various embodiments may be arbitrarily mixed and replaced with one another to form other new embodiments. In addition, the protection scope of the disclosure is not limited to the processes, machines, manufactures, compositions of the matter, devices, methods, and steps in the specific embodiments described in the specification. It is understood that processes, machines, manufactures, compositions of matter, devices, methods, and steps developed in the present or in the future may be used in accordance with the disclosure as long as they may implement substantially the same functions or achieve substantially the same results in the embodiments described herein. Therefore, the protection scope of the disclosure includes the above-mentioned processes, machines, manufactures, compositions of matter, devices, methods, and steps. In addition, each of the claims constitutes a separate embodiment, and the protection scope of the disclosure also includes each of the combinations of the claims and the embodiments. The protection scope of the disclosure shall be determined by the appended patent claims.

What is claimed is:

1. A viewing angle control element, comprising:
a first substrate;
a plurality of first spacer units, disposed on the first substrate;
a plurality of second spacer units, respectively disposed on the first spacer units; and
a second substrate, disposed on the second spacer units,
wherein a reflectivity of the first spacer units is greater than a reflectivity of the second spacer units, and
wherein a cross-sectional shape of at least one of the second spacer units comprises a plurality of steps stacked along a direction that is inclined relative to a stacking direction of the first substrate and the second substrate.

2. The viewing angle control element according to claim 1, wherein a material of the first spacers comprises a metal with a reflectivity greater than 80%.

3. The viewing angle control element according to claim 1, wherein a width of an upper surface of at least one of the first spacer units is greater than a width of a lower surface of at least one of the second spacer units.

4. The viewing angle control element according to claim 1, further comprising:
a transparent protective layer, disposed between the first substrate and the second substrate.

5. The viewing angle control element according to claim 1, wherein a material of the second spacer units comprises a light-absorbing material or a semi-transmitting and semi-reflecting material.

6. The viewing angle control element according to claim 1, wherein the second spacer units and the first spacer units are disposed in a one-to-one relationship.

7. The viewing angle control element according to claim 1, wherein a thickness of the first spacer units is 1 μm to 20 μm.

8. The viewing angle control element according to claim 1, wherein a thickness of the second spacer units is 1 μm to 20 μm.

9. The viewing angle control element according to claim 1, wherein a pitch of the first spacer units is 1 μm to 20 μm.

10. The viewing angle control element according to claim 1, wherein a pitch of the second spacer units is 5 μm to 100 μm.

11. The viewing angle control element according to claim 1, wherein a relative displacement of one of the first spacer units and a corresponding second spacer unit is 1 μm to 20 μm.

12. The viewing angle control element according to claim 1, wherein a tilt angle of a side surface of one of the second spacer units is 0 degrees to 60 degrees.

13. The viewing angle control element according to claim 1, wherein a distance between the first substrate and the second substrate is 10 μm to 100 μm.

14. A display module, comprising:
a backlight;
a display panel, disposed on the backlight; and
a viewing angle control element, disposed between the backlight and the display panel and comprising:
a first substrate;
a plurality of first spacer units, disposed on the first substrate;
a plurality of second spacer units, respectively disposed on the first spacer units; and
a second substrate, disposed on the second spacer units,
wherein a reflectivity of the first spacer units is greater than a reflectivity of the second spacer units, and
wherein a cross-sectional shape of at least one of the second spacer units comprises a plurality of steps stacked along a direction that is inclined relative to a stacking direction of the first substrate and the second substrate.

15. The display module according to claim 14, wherein the second spacer units comprise a first sub-unit and a second sub-unit, and the first sub-unit and the second sub-unit have different colors.

16. The display module according to claim 15, wherein the first sub-unit is disposed in a first region of the display module, and the second sub-unit is disposed in a second region of the display module.

17. The display module according to claim 14, wherein the second spacer units have various pitches or various densities.

18. The display module according to claim 14, wherein the viewing angle control element further comprises:
a transparent protective layer, disposed between the first substrate and the second substrate.

19. The display module according to claim 14, wherein a material of the first spacers comprises a metal with a reflectivity greater than 80%.

* * * * *